United States Patent
Hingos et al.

(10) Patent No.: US 12,111,961 B2
(45) Date of Patent: Oct. 8, 2024

(54) SECURE DATA EXTRACTION FROM COMPUTING DEVICES USING UNIDIRECTIONAL COMMUNICATION

(71) Applicant: Siemens Mobility GmbH, Munich (DE)

(72) Inventors: David Hingos, East Brunswick, NJ (US); Leandro Pfleger de Aguiar, Robbinsville, NJ (US); Omer Metel, Anchorage, KY (US); Safia Rahmat, Plainsboro, NJ (US)

(73) Assignee: Siemens Mobility GmbH, Munich (DE)

( * ) Notice: Subject to any disclaimer, the term of this patent is extended or adjusted under 35 U.S.C. 154(b) by 172 days.

(21) Appl. No.: 16/893,884

(22) Filed: Jun. 5, 2020

(65) Prior Publication Data

US 2021/0383027 A1 Dec. 9, 2021

(51) Int. Cl.
*G06F 21/78* (2013.01)
*G06F 13/38* (2006.01)
*G06F 21/60* (2013.01)

(52) U.S. Cl.
CPC ............ *G06F 21/78* (2013.01); *G06F 13/382* (2013.01); *G06F 21/606* (2013.01); *G06F 2213/0042* (2013.01)

(58) Field of Classification Search
CPC .. H01F 38/14; H01F 2048/143; G06F 13/382; G06F 21/606; G06F 21/78; G06F 2213/0042
See application file for complete search history.

(56) References Cited

U.S. PATENT DOCUMENTS 8,789,034 B1 * 7/2014 Emelyanov ......... G06F 9/45558
717/169
9,686,304 B1 * 6/2017 Guo ...................... G06F 21/562
(Continued)

FOREIGN PATENT DOCUMENTS

EP 3502911 A1 6/2019
WO 20200061388 A1 3/2020

OTHER PUBLICATIONS

NPL Search Terms (Year: 2022).*
(Continued)

*Primary Examiner* — Syed A Zaidi

(57) ABSTRACT

A micro data capture device can be configured to operate as a unidirectional connection from a first computing device to a second computing device. The micro data capture device can include a data capture side comprising a first universal serial bus (USB) interface configured to connect to the first computing device so as to extract data from the first computing device. The micro data capture device can further include a monitoring apparatus comprising an interceptor configured to copy data from the data capture side so as to define the unidirectional connection. Further, the micro data capture device can define a data storage side comprising a second USB interface configured to connect to the second computing device so as to transfer data to the second computing device. The data storage side can be configured to receive data from the data storage side via the monitoring apparatus. In some cases, the data capture side has only volatile memory, and the data storage side includes non-volatile memory. Further, the data capture side can be physically separate from the data storage side.

15 Claims, 5 Drawing Sheets

(56) References Cited

U.S. PATENT DOCUMENTS

| | | | |
|---|---|---|---|
| 9,864,606 B2* | 1/2018 | Mimms | G06F 13/4282 |
| 10,673,717 B1* | 6/2020 | Perevalov | H04L 41/0866 |
| 2004/0239800 A1* | 12/2004 | Yamano | H04N 23/651 |
| | | | 348/E5.042 |
| 2005/0120146 A1* | 6/2005 | Chen | G06F 13/28 |
| | | | 710/22 |
| 2006/0130154 A1* | 6/2006 | Lam | G06F 21/64 |
| | | | 726/30 |
| 2006/0174345 A1* | 8/2006 | Flanagan | G06F 21/56 |
| | | | 726/24 |
| 2011/0010470 A1* | 1/2011 | Hulbert | G06F 21/77 |
| | | | 710/63 |
| 2012/0030454 A1* | 2/2012 | Book | G06F 1/324 |
| | | | 710/63 |
| 2012/0242164 A1* | 9/2012 | Teggatz | H01F 21/12 |
| | | | 307/104 |
| 2015/0365237 A1 | 12/2015 | Soffer | |
| 2016/0321210 A1* | 11/2016 | Baterina | G06F 13/385 |
| 2019/0034669 A1* | 1/2019 | Lloyd | G06F 13/4022 |
| 2019/0042749 A1* | 2/2019 | Appleboum | H04L 63/1441 |
| 2019/0081983 A1* | 3/2019 | Teal | G06F 21/602 |

OTHER PUBLICATIONS

NPL Search Terms (Year: 2023).*

NPL Search Terms (Year: 2024).*

International Search Report corresponding to application No. PCT/US2021/035406 ; 12 pages.

Universal Serial Bus Type-C TM Port Controller Interface Specification; Hewlett-Packard Company, Intel Corporation, Microsoft Corporation, Renesas, STMicroelectronics, and Texas Instruments; Oct. 2017; Revision 2.0, Version 10.

* cited by examiner

SECURE DATA EXTRACTION FROM COMPUTING DEVICES USING UNIDIRECTIONAL COMMUNICATION

BACKGROUND

The threat of cyber attacker intrusion to industrial automation and control systems that support critical infrastructure has increased over time. In some cases, vertical integration of production systems, and horizontal integration of the value chain, have pressured industrial control systems (ICSs) to become more interconnected, although many critical processes continue to operate within physically segregated or air-gapped networks. It is recognized herein, however, that air-gapped networks are not free from security risks. Unlike typical computers in the information technology (IT) domain, ICS components or products, such as programmable logic controllers (PLCs), Distributed Control Systems (DCS), motion controllers, Supervisory Control and Data Acquisition (SCADA) servers, Human Machine Interfaces (HMIs), and the like, are often designed to perform control functionalities without intrinsic consideration for cybersecurity. Furthermore, often control system networks, which can include multiple PLCs, HMIs, DCS, SCADA and motion controllers, are integrated without an in-depth consideration for protection against cyber threats. Such lack or protections can make such Operations Technology (OT) systems highly vulnerable and easy to compromise after an initial infection or intrusion occurs. One of the many ways an initial infection can occur is via removable devices like a universal serial bus (USB).

USB provides easy connectivity for a wide range of devices. The USB device is ubiquitous and can often be used with impunity by users connecting it to untrusted hosts. The complex nature of USB can obscure functionalities of these devices, which may fool the operating system to which a USB is connected to trust physically connected devices that might not be trustworthy. Such deception has been misused by attackers so as to infiltrate systems using hidden keyboards or network adapters. In the OT domain, various incidents in the past, such as Stuxnet, have demonstrated attackers' capabilities regarding exploring alternative entry points for an initial infection in the critical infrastructure protection space. Other example incidents have included contaminating USB storage media, smart phones, and maintenance laptops.

Furthermore, the emergence of the industrial internet-of-things (IIoT) has affected assurance needs. The IIoT consists of various devices that are connected by communication software. In some cases, the compromise of a single device within an IIoT ecosystem may enable an attacker to monitor, collect, and/or control information so as to manipulate the environment without human intervention. Further, it is recognized herein that current approaches to security in industrial control systems lack capabilities related to protecting IIoT devices. Further still, given the risks associated with transient media such as USB, sensitive operations performed by security professionals, such as forensics and remediation, can be limited, for example, due to potential cross-contamination among different network segments.

BRIEF SUMMARY

Embodiments of the invention address and overcome one or more of the described-herein shortcomings by providing methods, systems, and apparatuses that can safely extract data from individual devices within an industrial internet-of-things (IIoT) environment. For example, data can be obtained from individual devices using a unidirectional USB-dongle or micro data capture device in a secure manner, such that the unidirectional USB-dongle or micro data capture device can safely extract data from multiple devices instead of, for example, having to use a different USB memory stick for each device. In some cases, the extracted data can be analyzed so as to determine whether a given device has been compromised. Such data extraction, in some cases, can enable computer forensics to take place in a compromised environment, without risking cross-contamination among different network segments during stages of the computer forensics (e.g., collecting memory, disk images).

In an example aspect, a micro data capture device is configured to operate as a unidirectional connection from a first computing device to a second computing device. The micro data capture device can include a data capture side comprising a first universal serial bus (USB) interface configured to connect to the first computing device so as to extract data from the first computing device. The micro data capture device can further include a monitoring apparatus comprising an interceptor configured to copy data from the data capture side so as to define the unidirectional connection. Further, the micro data capture device can define a data storage side comprising a second USB interface configured to connect to the second computing device so as to transfer data to the second computing device, for example, without the possibility of changing the data collected using the first USB interface. The data storage side can be configured to receive data from the data storage side via the monitoring apparatus. In some cases, the data capture side has only volatile memory, and the data storage side includes non-volatile memory. Further, the data capture side can be physically separate from the data storage side.

In another example aspect, a micro-DCU device can be connected, via a first USB interface or data extraction interface, to each of a plurality of industrial devices at different times. While the micro-DCU device is connected to each of the plurality of industrial devices, a data capture side of the micro-DCU device can extract respective data from each of the plurality of industrial devices so as to define extracted data. The extracted data can be transferred from the data capture side to a data storage side of the micro-DCU device over a unidirectional communication connection between the data capture side and the data storage side. In some cases, respective extracted data is transferred from a respective industrial device while the first USB interface is coupled with the respective industrial device. The extracted data can be stored, for instance stored in a flash memory, on the data storage side of the micro-DCU device. The extracted data can be filtered, for instance by a filter configuration on the data storage side, so as to remove content from the extracted data, thereby defining filtered data. One or more messages digests (e.g., hash values) representative of the filtered data can be generated, for instance by a hash application or module on the data storage side. The one or more message digests can be stored, for example, in the flash memory. The micro-DCU device can be connected via a second USB interface or to a storage device. The filtered data can be transferred to the storage device over the second USB interface.

BRIEF DESCRIPTION OF THE SEVERAL VIEWS OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Removable media, such as Universal Serial Bus (USB) storage devices, can be used within enterprise information technology (IT) domains and operational technology (OT) domains to transfer data. In some cases, packet-level filtering using rules in a USB might filter unauthorized interfaces from connecting to a given host. In other approaches, a user might need to explicitly allow or deny traffic based on what the USB device reports. In still other approaches, a given USB storage device might somehow validate the integrity of the host before any read/write operations are performed using the USB device. In another approach, a different USB device is used to extract data from different devices, so that the USB cannot infect a given device with data from another device. Such an approach requires many USB devices, which might not be practical. It is also recognized herein that current approaches fail to fully address security issues related to sharing data via removable media, such as USB devices.

Figure 1:
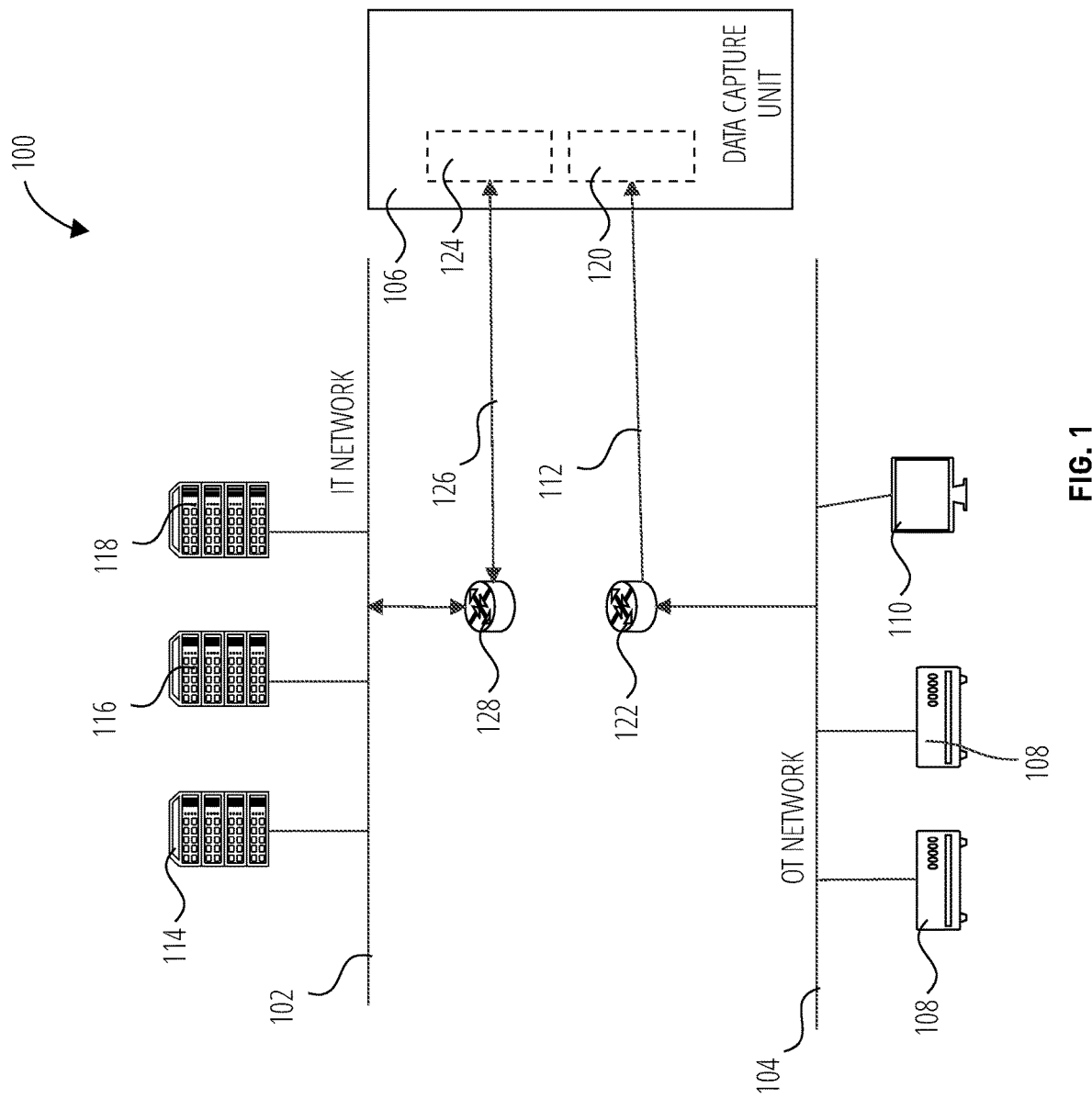
FIG. 1 is a block diagram of a data capture unit (DCU) apparatus deployed within an example industrial control system (ICS).

Referring initially to FIG. 1, an example distributed control system (DCS) or industrial control system (ICS) 100 includes an untrusted or unsecure IT network 102, such as an office or corporate network, and a secure or trusted operation technology (OT) network 104, such as a production network, communicatively coupled to the IT network 102 via a data control apparatus or data control unit (DCU) 106. As used herein, the DCU 106 can also be referred to as a data capture unit or device control unit, and such terms can be used interchangeably without limitation, unless otherwise specified. The IT network 102 can define an office or public network, which can include the cloud, that has lower security requirements than the OT network 104, which can define a private or critical production network such as a network in a petrochemical plant or nuclear power plant, among others. The DCU 106 can be configured to operate as a unidirectional communication connection between a private network and a public network. The DCU 106 can collect network traffic data that is shared over the OT network 104, via a communication link 112 from the OT network 104 to the DCU 106. In particular, for example, the OT network 104 can include various production machines configured to work together to perform one or more manufacturing operations. Example production machines of the production network 104 can include, without limitation, robots and other field devices, such as sensors, actuators, or other machines, which can be controlled by a respective programmable logic controller (PLC) 108. The PLC 108 can send instructions to respective field devices. In some cases, a given PLC 108 can be coupled, or the OT network 104 can otherwise include, human machine interfaces (HMIs) 110. It will be understood that the ICS 100 is simplified for purposes of example. That is, the ICS 100 may include additional or alternative nodes or systems, for instance other network devices, that define alternative configurations, and all such configurations are contemplated as being within the scope of this disclosure.

In some cases, the communication link 112 is configured to receive data from the OT network 104, but not send data to the production network 104, such that that communication link 112 defines a unidirectional communication link from the OT network 104 to the DCU 106. Thus, the DCU 106 can define a unidirectional communication connection between the IT network 102 and the OT network 104, for instance from the OT network 104 to the IT network 102 or, in alternative cases, from the IT network 102 to the OT network 104. Network packets that are collected by the DCU 106 can be used by cybersecurity functions that are performed on the IT network 102. The collected network packets can be sent from the DCU 106 to the IT network 102, in particular to systems within the IT network 102 such as, for example and without limitation, an Intrusion Detection System (IDS) 114, a Security Information and Event Management (SIEM) system 116, and a Forensic Analysis system 118.

With continuing reference to FIG. 1, the DCU 106 can include ports 120 that are connected to the OT network 104, for instance via a switch 122. The ports 120 can define a unidirectional interface that is configured to receive real or raw data packets without being able to send packets out. The DCU 106 can further include a multi-directional interface or port 124 that can communicate with the IT network 102, for instance via a switch 128. In particular, the multi-directional interface 124 can send data to, and receive data from, the IDS 114, the SIEM system 116, and the Forensic Analysis system 118. In some cases, for example, the multi-directional port 124 is exposed to the IT network 102 such that the IDS 114, the SIEM system 116, and the Forensic Analysis system 118 can access data packets collected by the DCU 106, so as to record packets and/or perform data packet analysis on the recorded packets.

Figure 2:
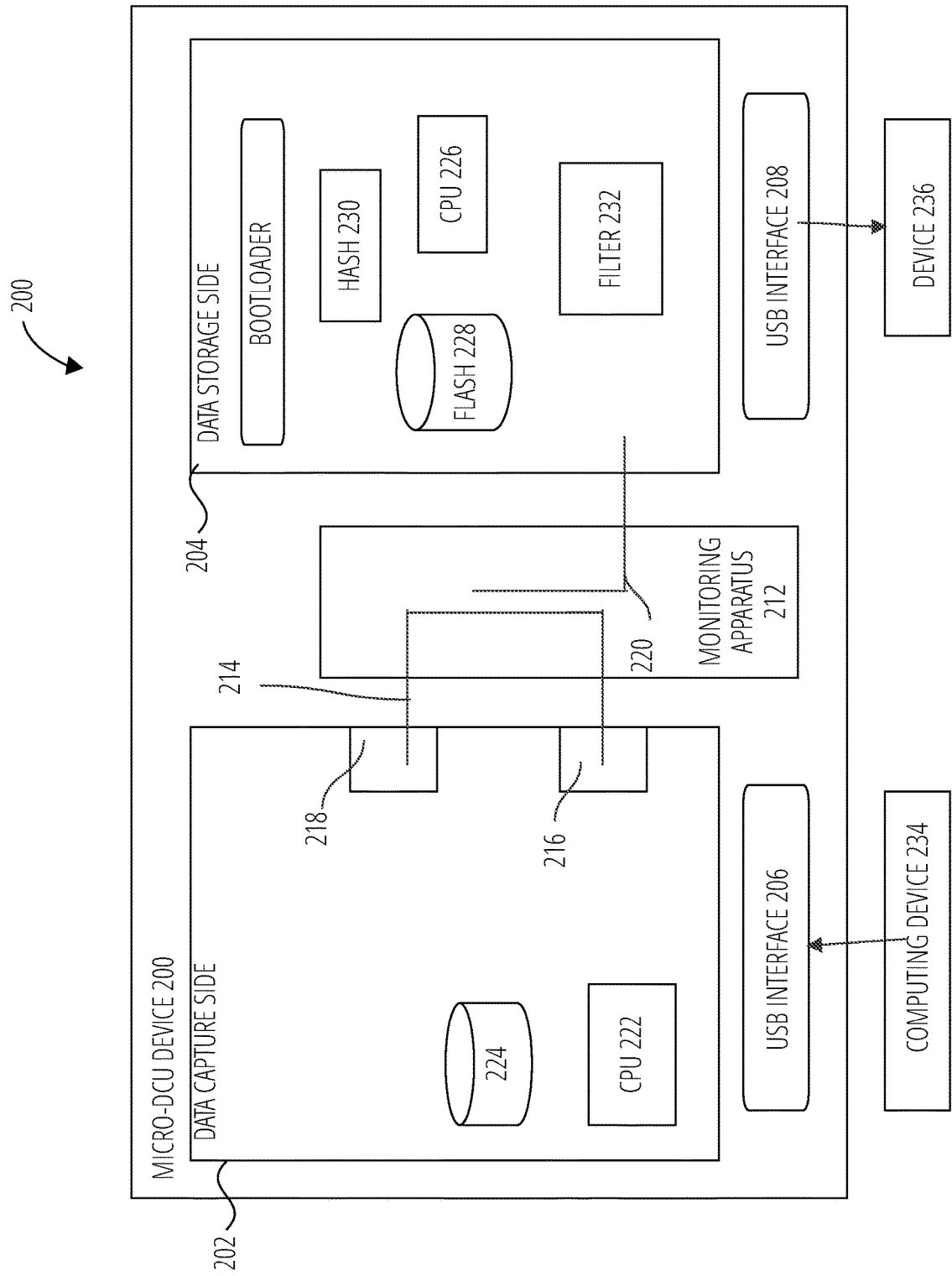
FIG. 2 is a block diagram of a micro-DCU device according to an example embodiment.

Referring now to FIG. 2, it is recognized herein that current unidirectional communication devices or nodes lack capabilities associated with transmitting or receiving data via USB ports. In an example embodiment, however, a micro-DCU device 200 can define a unidirectional transient communication device configured to be powered by a USB port, so as to collect data and transfer data between two USB ports without allowing data to flow back to any connected devices, thereby preventing malware cross-infection. The micro-DCU device 200 can be operated and powered according to USB specifications. Thus, the micro-DCU device 200 can address issues associated with extracting data in a forensically sound manner from computing devices via a USB interface. In various examples, such data extraction can be performed without shutting down or otherwise removing the hard disk, flash memory, or other storage media, so as to reduce or eliminate the potential for any malicious contamination. As an example, data might be extracted by the micro-DCU device 202 as part of security incident response activities, where a security compromise might exist in a target network. Removing data in response to such incidences currently often require systems to be shut down and related storage apparatuses (e.g., a hard disk) to be removed. For example, current responses might require that a disk is imaged using a disk write blocker.

In accordance with an example embodiment, the micro-DCU device 200 can include a sender machine or data capture side 202 and a receiver machine or data storage side 204 configured to receive data from the data capture side 202. The micro-DCU device 200 can further include a first USB or data extraction interface 206 coupled to the data capture side 202. The data extraction interface 206 can be configured to connect to a computing device, for instance to a USB port on the computing device, so as to extract data from the computing device over the USB connection. Thus, the first USB or data extraction interface 206 can define an input USB port of the micro-DCU device 200. The micro-DCU device 200 can also include a second USB or data storage interface 208 coupled to the data storage side 204. The data storage interface 208 can be configured to connect to a computing device, for instance to a USB port on the computing device, so as to unload data to the computing device over the USB connection. Thus, the second USB or data storage interface 208 can define an output USB port of the micro-DCU device 200. In some examples, the data extraction interface 206 and the data storage interface 208 can be located on opposite sides of the micro-DCU device 200, such that the micro-DCU device 200 can be connected to an input computing device and an output computing device at the same time. In particular, the data extraction interface 206 can be plugged into a computer USB port on one side of the micro-DCU device 200, and the data storage interface 208 can be plugged into a USB storage device on another side of the micro-DCU device 200, such that the micro-DCU device 200 can define an interception gateway between the connected devices by monitoring and logging traffic. Further, the micro-DCU device 200 can perform as an interception gateway by interrupting specific traffic types that flow across the USB interfaces, or by blocking active contamination attempts through USB ports. Thus, malicious code that potentially exists at a source machine can be blocked from contaminating another non-infected machine during the process of colleting images or data. It is recognized herein that such malware (e.g., worms, Stuxnet, Dugu) can be silent and can otherwise actively infect machines without making its behavior or presence known.

In some examples, the data extraction interface 206 only allows data to be received from, and not sent to, computing devices, such that only unidirectional communications are allowed from computing devices to the data capture side 202 of the micro-DCU device 200. The computing devices from which data is extracted may be part of the OT network 104, which may define a critical or private network such as, for example, a network for industrial automation, a financial network, a network for railway automation and control, a life-critical system, or the like. The micro-DCU device 200 can monitor the data extraction interface 206. In particular, in some cases, the data extraction interface 206 can be monitored for various USB traffic types and flows. By monitoring, specific data, for instance payload content, can be extracted and sent to toward the data storage interface 208 of the micro-DCU device 200, as further described herein.

The micro-DCU device 200 can further include a monitoring apparatus 212 configured to transfer data, for instance USB payload data, from the data capture side 202 to the data storage side 204 without permitting data to be transferred from the data storage side 204 to the data capture side 202. In some examples, the monitoring apparatus 212 can include miniaturized electrical transformers that define a data copier or network tap, so as to provide unidirectional data transmission from the data capture side 202 to the data storage side 204 without the data capture side 202 and the data storage side 204 being hardwired together. In an example, the monitoring apparatus 212 can include a wire 214 arranged in a loop, such that the wire 214 is connected to an output 216 defined by the data capture side 202, and to an input 218 defined by the data capture side 202. Thus, data can be transmitted by the data capture side 202 at the output 216, along the wire 214, and back to the data capture side 202 at the input 218. The input 218 and the output 216 of the data capture side 202 can be isolated from the data extraction interface 206. In an example, the monitoring apparatus 212, in particular the wire 214, can define an inductor so as to transfer data from the data capture side 202 to the data storage side 204 without a conductive wire or cable connected between the data capture side 202 and the data storage side 204. For example, the monitoring apparatus 212 can further include an interceptor 220 that is connected to the data storage side 204. In some examples, the interceptor 220 can define a conductive wire such that the conductive wire and the wire 214 that defines the loop can be inductively coupled with one another.

Thus, in an example, a data stream can pass through the loop from the output 216 through the wire 214 to the input 218. Such a data stream can be duplicated inductively by the interceptor 220, and passed to the data storage side 204 via the connection between the interceptor 220, for instance the conductive wire, and the data storage side 204. The original data stream that passes through the loop can remain unchanged from the output 216 to the input 218. Thus, the monitoring apparatus 212 can define an inductive configuration that connects the data capture side 202 to the data storage side 204, and thus can connect a computing device on the OT network 104 to a computing device on the IT network 102, or devices on any networks as desired.

In an example, the monitoring apparatus can define an inductor mechanism that is arranged such that when electrical signals are injected from the direction opposite of the unidirectional communication direction, a voltage level is required to transfer the electrical signals that is above the voltage that available on the micro-DCU device 200, in particular the USB interfaces 206 and 208. Thus, such an inductor mechanism can define the unidirectional communication connection between the data capture side 202 and the data storage side 204.

Still referring to FIG. 2, the data capture side 202 can include one or more processors, for instance a central processing unit (CPU) 222, for executing machine-readable instructions. The CPU 222 can execute instructions to perform tasks, and can include a combination of hardware and firmware. The data capture side 202 may also include memory 224. In some examples, the memory 224 can include random-access memory (RAM) or an otherwise define memory that is not persistent. Thus, data that is stored in the memory 224 can define volatile data that is lost from the data capture side 202 when power is removed from the micro-DCU device 200. Additionally, or alternatively, the data storage side 204 and/or the data storage side can include read only memory on which an operating system (OS) of the micro-DCU device 200 is configured to be re-loaded during each reboot of the micro-DCU device 200. Thus, either or both sides of the micro-DCU device 200 can be stateless so as to prevent malware contamination attempts to persist across operations of file copy. In particular, the micro-DCU device 200 can include a read-only memory on which an operating system of the micro-DCU device 200 can be configured to be re-loaded each time the micro capture device connects to the a given computing device via the first USB interface 206 or a given computing device via the second USB interface 208. Thus, during each of the different times that the micro-DCU device 200 device is connected to a device, an operating system of the micro-data capture device can be re-loaded on the micro-data capture device.

The data storage side 204 can also include one or more processors, for instance a CPU 226, for executing machine-readable instructions. The CPU 226 can execute instructions to perform tasks, and can include a combination of hardware and firmware. The data storage side 204 can further include non-volatile memory, for instance flash memory 228, that defines persistent memory. Thus, data that is stored in the flash memory 228 of the data storage side 204 can be saved after power is removed from the micro-DCU device 200. In an example, power is removed from the micro-DCU device 200 when the micro-DCU device 200 is decoupled or removed from a computing device, for example a computing device from which data is extracted or a computing device to which data is saved.

In an example, data that is copied from the data capture side 202 can be stored in the flash memory 228. Similarly, data that is extracted by the data capture side 202 from a computing device, for instance a computing device within the OT network 104, can be buffered in the memory 224 of the data capture side 202, for example, before being transmitted via the wire 214 of the monitoring apparatus 212 at regular intervals, predefined times, or the like. Data that can be collected by the data capture side 202, for instance from OT computing devices, can include, for example and without limitation, file system images, windows logs, network traffic data, or the like. Such data can be collected for analysis during a response to a security incident, among other uses. By way of another example, collected data can be used to model behavior of various devices, for instance IIoT devices. By way of yet another example, the micro-DCU device 200 can be used to collect data from various devices, which then can be used for training an anomaly detection model. In some cases the data capture side 202 has no persistent memory, such that data collected from a given computing device connected to the data capture side 202 cannot infect data from another computing device that was previously connected to the data capture side 202 because, for example, the data in the memory 224 of the data capture side 202 is lost when the USB power is removed from the data capture side 202.

With continuing reference to FIG. 2, the data storage side 204 may include various applications or modules, such as a hash application 230 configured to compute message digests, for instance hash values or the like. In some cases, the data capture side 202 may also, or alternatively, include the hash application 230. For example, the hash application 230 can calculate hashes of data or files that are stored in the flash memory 228. Such hashes can be stored for forensic purposes, among others. For example, the hash application 230 can be used to prove the chain of custody of data during forensics. For example, the original data and the corresponding hash of the data can be stored, and the hash can be calculated and compared to the stored hash so as to verify the data before sending it. Thus, data can be verified as being unmodified before it is sent. Such hashes can also prove that files extracted correspond to files that that were collected from source machines, for instance the computing device 234.

The data storage side 204, and thus the micro-DCU device 200, may also include filters or a filter configuration 232 configured to ensure the quality of data that is transferred over the data storage interface 208 to a given host. In an example, the filter configuration 232 can remove malicious files when the files are received from the data capture side 202. The filter configuration 232 can be configured to operate in various modes so as to filter data based on various criteria. In an example mode, the filter configuration 232 can filter data based on its source or destination. Alternatively, or additionally, the filter configuration 232 can filter data based on the time or date associated with the data. In another example mode, the filter configuration 232 can filter data based on a file format or syntax of the data. Alternatively, or additionally, the filter configuration 232 can filter data based on file semantics associated with the data. In yet another example mode, the filter configuration 232 can perform format reconstruction. For example, an incoming file can be received by the filter configuration 232, and the file can be decomposed based on a specification or policy, for instance a specification or policy provided by a user. When the file is decomposed, portions of the file can be removed and then the file can be reconstructed without the removed portions so as to define a reconstructed file. The reconstructed file can be sent to the host via the data storage interface 208. Portions of the deconstructed file that are removed may include malicious content, extra content, or the like. As an example, the filter configuration 232 can perform binary reconstruction of a PDF file. For example, a PDF file can be created on the data storage side 204, and content or portions that are innocuous can be copied from the data capture side 202 to the created PDF file on the data storage side 204, thereby blocking maliciously injected active behavior from being transferred to the destination.

In yet another example, the host or target computing device may provide a policy, for instance a policy that is based its security requirements, and the filter configuration 232 can filter data in accordance with the policy. Thus, the filter configuration 232 can filter data based on a policy associated with the target destination of the data. In various examples, the filter configuration 232 can prevent script files or suspicious or malicious files having encrypted data from entering a given host. The data can be retrieved from the flash memory 228 and filtered by the filter configuration 232 before being sent to the host via the data storage interface 208.

In an example, the filter configuration 232 can read and/or delete data from the flash memory 228. In some cases, the filter configuration 232 can filter and/or compress data in accordance with a policy. Further, the filter configuration 232 can transmit a portion of copied data from the data capture side 202 to a host computing device over the data storage interface 208. In some cases, data can be transmitted over the data storage interface 208 by way of a push mechanism, for instance by passing data as in a publish-and-subscribe approach. Additionally, or alternatively, data can be transmitted over the data storage interface 208 by way of a pull mechanism by the target host. For example, a target host can actively request data from the flash memory 228 or the data storage side 204 via the data storage interface 208.

With continuing reference to FIG. 2, the micro-DCU device 200 can transfer data between various computing devices for various reasons, in accordance with some embodiments. For example, the micro-DCU device 200 can be configured to operate as a unidirectional communication connection from a first computing device 234 to a second computing device 236. In an example, firmware can be uploaded to the second computing device 236 from the first computing device 234 via the micro-DCU device 200. For example, the second computing device 236 can be a device in the OT network 104, and the micro-DCU device 200 can load a firmware patch on the second computing device 236. Thus, the micro-DCU device 200 can help with patching of firmware in an OT environment. It is recognized herein that current patch management typically requires that a given workstation is connected to the internet to download the latest patch, and then the workstation can be brought to the OT network. Such a scenario can increase the probability of a compromise to a given OT network. In contrast, in accordance with various embodiments, the USB connection provided by the micro-DCU device 200 can enable patches or upgrades to firmware of various devices within a given OT network. The micro-DCU device 200 can secure the connection between a USB device containing the patch for the firmware and the host computing device that is being patched.

In some cases, the first computing device 234 can be one of a plurality of industrial devices, and the second computing device 236 can define a storage device. Thus, the micro-DCU device 200 can operate as a unidirectional communication connection between a plurality of industrial devices and a storage device, so as to transfer data from the industrial devices to a target or storage device or system. In particular, the micro-DCU device 200 can download data from one or more first computing devices 234, and upload data to the second computing device 236, so as to acts as mediator between devices. The data that is uploaded can be stored and/or analyzed. In such a scenario, the first USB or data extraction interface 206 can be connected to the first computing device so that the data capture side 202 receives the data. The data capture side 202 can mirror the data to the data storage side 204. The data can be sanitized at the filter configuration 232 before being uploaded to the target machine or second computing device 236. The micro-DCU device 200 can define a dead end at the data storage side 204, such that no data from the target machine or second computing device 236 is uploaded to the micro-DCU device 200. The volatile memory 224 on the data capture side 202 can also ensures that there is no infection or data transmission from prior downloads to the micro-DCU device 200.

In some cases, the same micro-DCU device 200 can collect data from various host machines to store it at a central database to be used by a forensics analyzer. Thus, referring to FIG. 2, the first computing device 234 can be one of a plurality of host machines, and the second computing device 236 can define a central database. For example, the data capture side 202 can be connected to a given host machine and memory data, file images, logs, and the like can be obtained or extracted from the host machine. In an example, the extracted data can be stored in the flash memory 228 and then transferred to the central database or server after being filtered by the filter configuration 232. In various examples, the second USB or data storage interface 208 includes an output port that defines a form factor that allows other USB storage devices to be connected, in such a way that standard USB flash drives can be used in conjunction with the micro-DCU device 200. Thus, the micro-DCU device 200 can be configured as a one-way gateway for specific USB traffic, such that data can be written for a computer that is being examined. Specifically, data can be sent from a USB device (e.g., computing device 234) to a host computer (e.g., second computing device 236), and the micro-DCU device 200 can be configured to block all or specific transactions from the USB device to the host, for example, so as to prevent changes to the host computer by the connected USB device. In some examples, the micro-DCU device 200 can capture at least some, for instance all, of the USB traffic as a record of the USB transactions. The micro-DCU device 200 can capture the traffic by digitally signing a log, for instance by the hash application 230, and storing the log in a protected area of the data storage side 204, for instance in the flash memory 228 digitally signed log. Alternatively, or additionally, the log can be stored on a separate forensics flash memory or the like. Storing such records or logs can enable the micro-DCU device 200 to be audited, so as to ensure that the attached USB device (e.g., computing device 234) did not modify the host computer (e.g., second computing device 236). Further, if the host computer is modified, the modification can be reliably tracked and evaluated during the review of collected evidence.

In some examples, firmware on the data capture side 202 can equipped with additional forensic tools that allow computers under examination to have their primary and secondary memory to be dumped securely through the micro-DCU device 200. Further, the data storage side 204 can be equipped with software, for instance the hash application 230, that computes cryptographic hashes for key memory blocks continuously. Such hashes can be saved to the flash memory 228 and/or to a secondary forensic flash memory.

Figure 3:
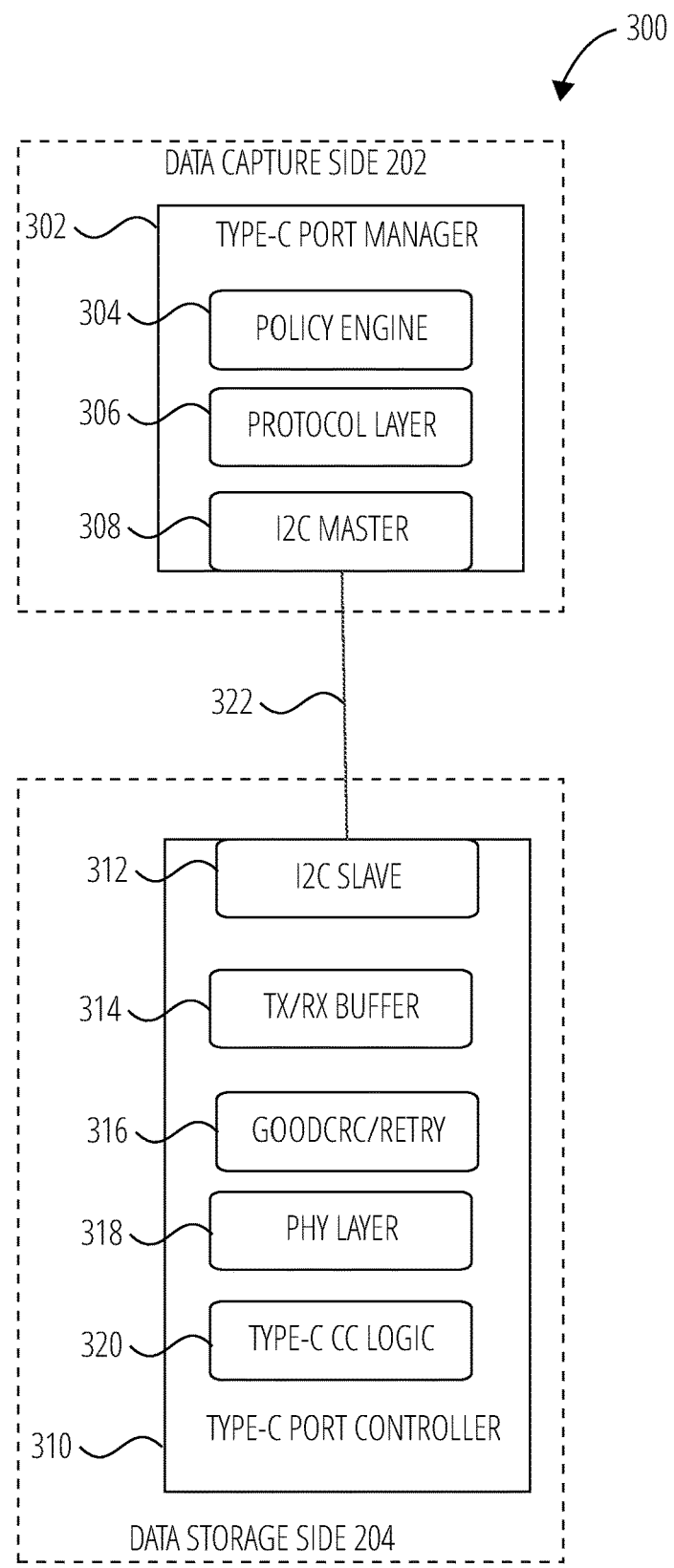
FIG. 3 illustrates an example USB controller stack that can be defined by the micro-DCU device in accordance with an example embodiment.

Referring now to FIG. 3, an example USB controller stack 300 is shown, which can be defined by the micro-DCU device 200. In particular, the data capture side 202 can define a Type-C Port manager 302, which can include a policy engine 304, a protocol layer 306, and an I2C master 308. The data storage side 204 can define a Type-C Port Controller 310, which can include an I2C slave 312, a Tx/Rx buffer 314, a GoodCRC/Retry 316, a physical layer 318, and a Type-C CC logic 320. The I2C master 308 and the I2C slave 312 can define a TCPC Interface (TCPCI) 322 between the data capture side 202 and the data storage side 204.

Figure 4:
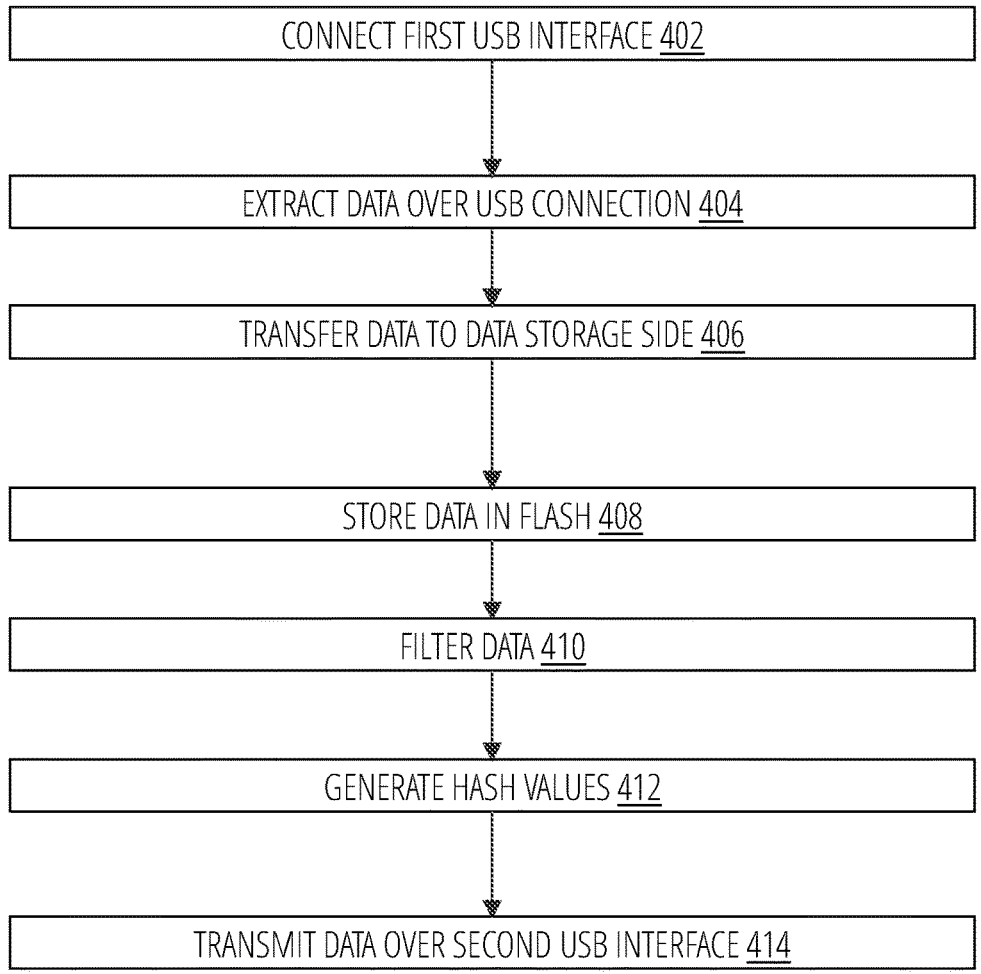
FIG. 4 is a flow diagram that can be performed by the micro-DCU device in accordance with an example embodiment.

Referring now to FIG. 4, example operations 400 can be performed with the micro-DCU device 200, so as to extract and store data from a plurality of industrial devices. At 402, the micro-DCU device 200 can be connected, via the first USB interface or data extraction interface 206, to each of the plurality of industrial devices at different times. At 404, while the micro-DCU device 200 is connected to each of the plurality of industrial devices, the data capture side 202 can extract respective data from each of the plurality of industrial devices so as to define extracted data. At 406, the extracted data can be transferred from the data capture side 202 to the data storage side 204 of the micro-DCU device 200 over a unidirectional communication connection between the data capture side 202 and the data storage side 204. In some cases, respective extracted data is transferred from a respective industrial device while the first USB data extraction interface 206 is coupled with the respective industrial device. At 408, the extracted data can be stored, for instance stored in the flash memory 228, on the data storage side 204 of the micro-DCU device 200. At 410, the extracted data can be filtered, for instance by the filter configuration 232, so as to remove content from the extracted data, thereby defining filtered data. At 412, one or more hash values representative of the filtered data can be generated, for instance by the hash application 230. The one or more hash values can be stored, for example, in the flash memory 228. At 414, the micro-DCU device 200 can be connected via the second USB interface or the data storage interface 208 to a storage device. Further, at 414, the filtered data can be transferred to the storage device over the second USB interface 208.

Figure 5:
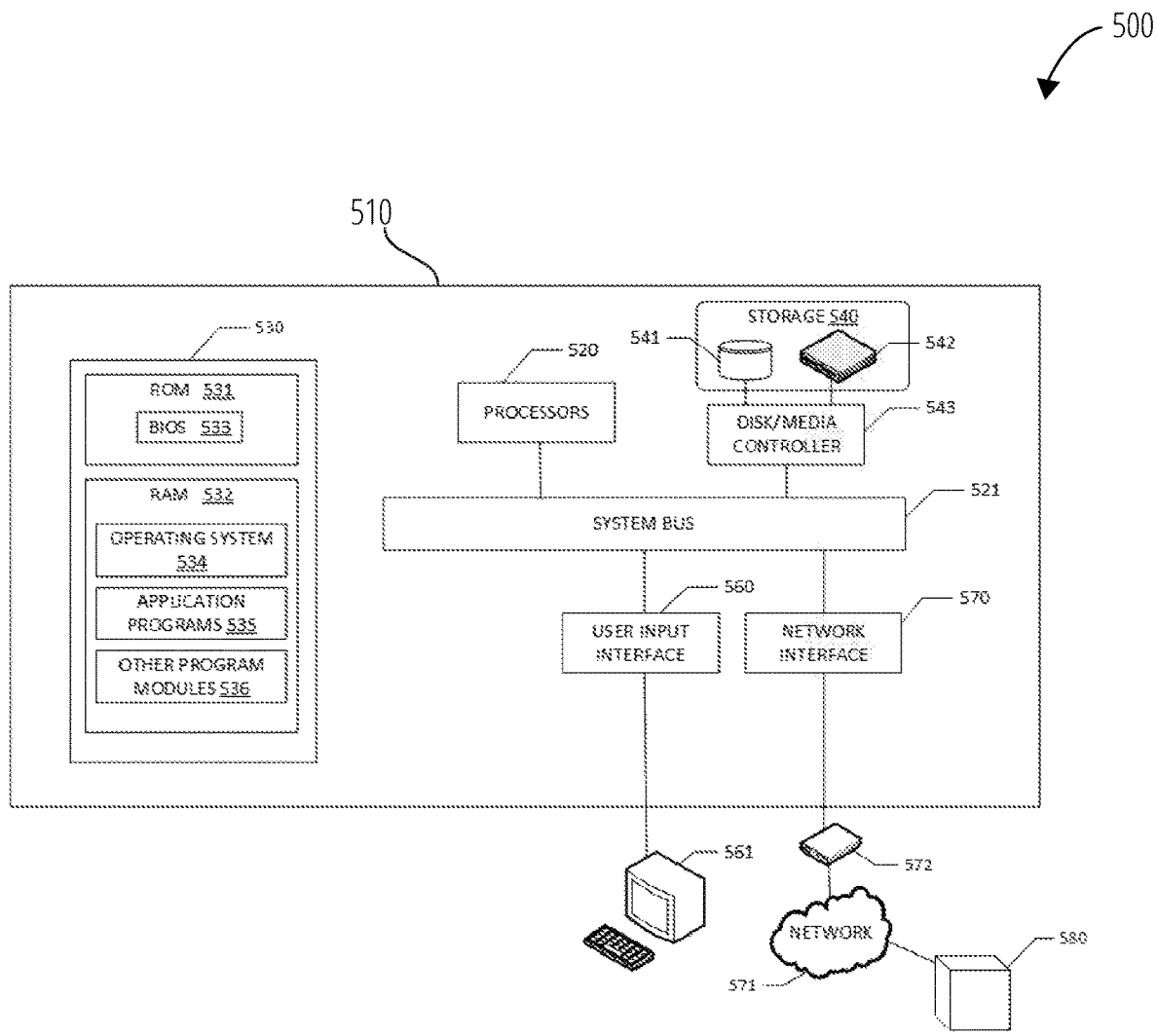
FIG. 5 illustrates a computing environment within which embodiments of the disclosure may be implemented.

FIG. 5 illustrates an example of a computing environment within which embodiments of the present disclosure may be implemented. A computing environment 500 includes a computer system 510 that may include a communication mechanism such as a system bus 521 or other communication mechanism for communicating information within the computer system 510. The computer system 510 further includes one or more processors 520 coupled with the system bus 521 for processing the information. The robot device 104 may include, or be coupled to, the one or more processors 520.

The processors 520 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 520 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 521 may include at least one of a system bus, a memory bus, an address bus, or a message bus, and may permit exchange of information (e.g., data (including computer-executable code), signaling, etc.) between various components of the computer system 510. The system bus 521 may include, without limitation, a memory bus or a memory controller, a peripheral bus, an accelerated graphics port, and so forth. The system bus 521 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 4, the computer system 510 may also include a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application programs 535, and other program modules 536. Application programs 535 may also include a user portal for development of the application program, allowing input parameters to be entered and modified as necessary.

The operating system 534 may be loaded into the memory 530 and may provide an interface between other application software executing on the computer system 510 and hardware resources of the computer system 510. More specifically, the operating system 534 may include a set of computer-executable instructions for managing hardware resources of the computer system 510 and for providing common services to other application programs (e.g., managing memory allocation among various application programs). In certain example embodiments, the operating system 534 may control execution of one or more of the program modules depicted as being stored in the data storage 540. The operating system 534 may include any operating system now known or which may be developed in the future including, but not limited to, any server operating system, any mainframe operating system, or any other proprietary or non-proprietary operating system.

The computer system 510 may also include a disk/media controller 543 coupled to the system bus 521 to control one or more storage devices for storing information and instructions, such as a magnetic hard disk 541 and/or a removable media drive 542 (e.g., floppy disk drive, compact disc drive, tape drive, flash drive, and/or solid state drive). Storage devices 540 may be added to the computer system 510 using an appropriate device interface (e.g., a small computer system interface (SCSI), integrated device electronics (IDE), Universal Serial Bus (USB), or FireWire). Storage devices 541, 542 may be external to the computer system 510.

The computer system 510 may also include a field device interface 565 coupled to the system bus 521 to control a field device 566, such as a device used in a production line. The computer system 510 may include a user input interface or GUI 561, which may comprise one or more input devices, such as a keyboard, touchscreen, tablet and/or a pointing device, for interacting with a computer user and providing information to the processors 520.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium of storage 540, such as the magnetic hard disk 541 or the removable media drive 542. The magnetic hard disk 541 and/or removable media drive 542 may contain one or more data stores and data files used by embodiments of the present disclosure. The data store 540 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 500 may further include the computer system 510 operating in a networked environment using logical connections to one or more remote computers, such as remote computing device 580. The network interface 570 may enable communication, for example, with other remote devices 580 or systems and/or the storage devices 541, 542 via the network 571. Remote computing device 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

It should be appreciated that the program modules, applications, computer-executable instructions, code, or the like depicted in FIG. 5 as being stored in the system memory 530 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 510, the remote device 580, and/or hosted on other computing device(s) accessible via one or more of the network(s) 571, may be provided to support functionality provided by the program modules, applications, or computer-executable code depicted in FIG. 4 and/or additional or alternate functionality. Further, functionality may be modularized differently such that processing described as being supported collectively by the collection of program modules depicted in FIG. 5 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 5 may be implemented, at least partially, in hardware and/or firmware across any number of devices.

It should further be appreciated that the computer system 510 may include alternate and/or additional hardware, software, or firmware components beyond those described or depicted without departing from the scope of the disclosure. More particularly, it should be appreciated that software, firmware, or hardware components depicted as forming part of the computer system 510 are merely illustrative and that some components may not be present or additional components may be provided in various embodiments. While various illustrative program modules have been depicted and described as software modules stored in system memory 530, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A micro data capture device configured to operate as a unidirectional connection from a first computing device to a second computing device, the micro data capture device comprising:

a data capture side comprising a first universal serial bus (USB) interface configured to connect to the first computing device and to extract data from the first computing device;

a monitoring apparatus comprising an interceptor in a loop configured to copy data from the data capture side and to define the unidirectional connection;

a data storage side comprising a second USB interface configured to connect to the second computing device and to transfer data to the second computing device, the data storage side configured to receive data from the data capture side via the monitoring apparatus, the data storage side further configured to filter data received from the data capture side so as to remove content from the data received from the data storage side before transferring data to the second computing device, wherein the data capture side further comprises only a volatile memory such that no other memory resides on the data capture side, the volatile memory comprising data that is lost from the data capture side when power is removed from the micro data capture device; and a read-only memory on which an operating system of the micro capture device is configured to be reloaded each time the micro capture device connects to the first computing device via the first USB interface and each time the micro capture device connects to the second computing device via the second USB interface.

2. The micro data capture device of claim 1, wherein the data capture side is physically separate from the data storage side.

3. The micro data capture device of claim 2, wherein the data capture side is inductively coupled to the data storage side.

4. The micro data capture device of claim 3, wherein the data capture side further comprises an input and an output, and the monitoring apparatus further comprises a wire coupled to the input and the output in the loop, the interceptor connected to the data storage side and inductively coupled to the loop, thereby defining the unidirectional connection from the data capture side to the data storage side.

5. The micro data capture device of claim 1, wherein the data storage side further comprises a flash memory that defines non-volatile memory, the flash memory configured to store data that is received from the data capture side.

6. The micro data capture device of claim 5, the data storage side further configured to:
retrieve data from the flash memory, thereby defining retrieved data, the retrieved data received from the data capture side; and
transmit a first portion of the retrieved data to the second computing device over the second USB interface.

7. The micro data capture device of claim 6, wherein the data storage side further comprises a filter configuration, the filter configuration configured to remove a second portion of data from the retrieved data, thereby defining the first portion of the retrieved data.

8. The micro data capture device of claim 7, wherein the filter configuration is further configured to remove the second portion of data from the retrieved data based on at least one of: a source or destination of the retrieved data, a time or date associated with the retrieved data, a file format or syntax associated with the retrieved data, or file semantics associated with the retrieved data.

9. The micro data capture device of claim 7, wherein the retrieved data comprises an incoming file, and the filter configuration is further configured to:
decompose the incoming file, thereby defining a decomposed file;
identify and remove malicious content and extra content from the decomposed file; and
recompose the incoming file without the removed content, thereby defining first portion of the retrieved data.

10. The micro data capture device of claim 7, wherein the filter configuration is further configured to remove the second portion of data from the retrieved data based on a policy associated with the second computing device.

11. The micro data capture device of claim 6, wherein the data storage side further comprises a hash module configured to generate one or more message digests representative of the first portion of the retrieved data.

12. The micro data capture device of claim 1, wherein the first and second USB interfaces are disposed on opposite sides of the micro data capture device.

13. A method of storing data from a plurality of industrial devices, the method comprising:
connecting a micro data capture device, via a first universal serial bus (USB) interface of the micro data capture device, to each of the plurality of industrial devices at different times;
while the micro data capture device is connected to each of the plurality of industrial devices, extracting, by a data capture side of the micro data capture device, respective data from each of the plurality of industrial devices, thereby defining extracted data;
transferring the extracted data from the data capture side to a data storage side of the micro data capture device over a unidirectional communication connection between the data capture side and the data storage side, the unidirectional communication connection arranged in a loop;
storing the extracted data in a flash memory on the data storage side of the micro data capture device;
filtering, by the data storage side, the extracted data from the data capture side by removing content from the extracted data, thereby defining filtered data, wherein the data capture side further comprises only a volatile memory such that no other memory resides on the data capture side, the volatile memory comprising data that is lost from the data capture side when power is removed from the micro data capture device; and
during each of the different times that the micro data capture device is connected to the respective industrial devices via the first USB interface and during each of the different times that the micro data capture device is connected to a storage device via a second USB interface, re-loading an operating system of the micro data capture device on the micro data capture device.

14. The method of claim 13, the method further comprising:
connecting the micro data capture device, via the second USB interface of the micro data capture device, to the storage device; and
transferring the filtered data to the storage device over the second USB interface.

15. The method of claim 13, the method further comprising:
generating one or more message digests representative of the filtered data; and
storing the one or more message digests in the flash memory.

* * * * *